United States Patent
Woodlock

(10) Patent No.: US 10,040,598 B2
(45) Date of Patent: Aug. 7, 2018

(54) FOLDABLE STRUCTURES

(71) Applicant: Bellfig Creative, LLC, Denver, CO (US)

(72) Inventor: Eric Brice Woodlock, Denver, CO (US)

(73) Assignee: Bellfig Creative, LLC, Denver, CO (US)

( * ) Notice: Subject to any disclaimer, the term of this patent is extended or adjusted under 35 U.S.C. 154(b) by 743 days.

(21) Appl. No.: 14/465,500

(22) Filed: Aug. 21, 2014

(65) Prior Publication Data
US 2015/0053240 A1    Feb. 26, 2015

Related U.S. Application Data

(60) Provisional application No. 61/868,278, filed on Aug. 21, 2013.

(51) Int. Cl.
| | |
|---|---|
| *B65D 8/14* | (2006.01) |
| *B65D 6/18* | (2006.01) |
| *A47J 47/02* | (2006.01) |

(52) U.S. Cl.
CPC ........... *B65D 11/1846* (2013.01); *A47J 47/02* (2013.01); *Y02W 30/807* (2015.05)

(58) Field of Classification Search
CPC .... B65D 11/1846; A47J 47/02; Y02W 30/807
USPC ........................................................ 220/4.01
See application file for complete search history.

(56) References Cited

U.S. PATENT DOCUMENTS

| | | | | | |
|---|---|---|---|---|---|
| 427,874 | A | * | 5/1890 | Jones | A47J 43/07 141/337 |
| 2,100,888 | A | * | 11/1937 | Vine | B67C 11/02 141/337 |
| 2,388,501 | A | * | 11/1945 | Schrader | A01C 7/02 141/333 |
| 2,605,582 | A | * | 8/1952 | Allen | A01K 69/06 141/331 |
| 3,572,318 | A | * | 3/1971 | Garland | A61B 10/007 141/337 |
| 3,815,646 | A | * | 6/1974 | Coakley | B67C 11/02 141/337 |
| 3,844,337 | A | * | 10/1974 | Bessett | B22C 9/082 141/337 |

(Continued)

FOREIGN PATENT DOCUMENTS

DE    102010036953 A1    1/2012

OTHER PUBLICATIONS

Joseph Joseph, "Our Products—Search Results for 'Flat-Fold'", "webpage found at http://www.josephjoseph.com/search/index/?s=flat-fold&submit=Search downloaded on Nov. 20, 2014", , pp. 2, Publisher: Joseph Joseph, Published in: US.

(Continued)

*Primary Examiner* — Ernesto Grano
(74) *Attorney, Agent, or Firm* — Neugeboren O'Dowd PC

(57) ABSTRACT

A reusable and washable storage device comprising a plurality of sides and a plurality of hinges. Each the plurality of hinges are placed between at least two of the plurality of sides and comprise an axis of rotation. The plurality of sides rotate about the axis of rotation from a first position to a second position.

7 Claims, 10 Drawing Sheets

(56) References Cited

U.S. PATENT DOCUMENTS

| | | | | |
|---|---|---|---|---|
| 4,108,222 A * | 8/1978 | Kaufman | B67C 11/02 | |
| | | | 141/337 | |
| 4,158,631 A * | 6/1979 | Whelan | B44D 3/10 | |
| | | | 210/497.01 | |
| 4,235,346 A | 11/1980 | Liggett | | |
| 4,405,077 A | 9/1983 | Kupersmit | | |
| D274,208 S * | 6/1984 | Hildenbrand | D7/700 | |
| 4,531,245 A * | 7/1985 | Lowd | A47K 11/00 | |
| | | | 141/337 | |
| 4,703,867 A * | 11/1987 | Schoenhard | F01M 11/04 | |
| | | | 141/331 | |
| 4,751,751 A * | 6/1988 | Reno | A61F 5/4556 | |
| | | | 141/337 | |
| D296,496 S * | 7/1988 | Kang | D2/877 | |
| 4,825,915 A * | 5/1989 | Hess | B65D 33/002 | |
| | | | 141/337 | |
| 4,828,132 A * | 5/1989 | Francis, Jr. | B65D 11/1853 | |
| | | | 16/225 | |
| 4,948,039 A | 8/1990 | Amantangelo | | |
| 5,004,353 A * | 4/1991 | Martin | B01F 13/0016 | |
| | | | 141/331 | |
| 5,042,713 A * | 8/1991 | Stafford | B65D 5/32 | |
| | | | 229/117.01 | |
| 5,060,849 A * | 10/1991 | King | B65D 5/0005 | |
| | | | 119/165 | |
| 5,078,189 A * | 1/1992 | Ronsonet | B67C 11/02 | |
| | | | 141/331 | |
| 5,101,870 A * | 4/1992 | Farris | B65D 1/02 | |
| | | | 141/343 | |
| 5,104,012 A * | 4/1992 | McAllister | F16N 37/00 | |
| | | | 222/528 | |
| 5,121,779 A * | 6/1992 | Green | B67C 11/02 | |
| | | | 141/331 | |
| 5,159,306 A * | 10/1992 | Rousseau | F16B 21/088 | |
| | | | 335/210 | |
| 5,207,425 A * | 5/1993 | Cohrs | A63F 11/0002 | |
| | | | 141/332 | |
| 5,257,707 A * | 11/1993 | Soede | B65D 5/3607 | |
| | | | 206/597 | |
| 5,292,060 A | 3/1994 | Focke et al. | | |
| 5,299,704 A * | 4/1994 | Thorby | B65D 7/26 | |
| | | | 220/6 | |
| 5,323,921 A | 6/1994 | Olsson | | |
| D364,630 S * | 11/1995 | Akiona | D15/150 | |
| 5,501,758 A | 3/1996 | Nitardy | | |
| 5,524,789 A * | 6/1996 | Jackman | B65D 5/40 | |
| | | | 215/900 | |
| 5,555,989 A * | 9/1996 | Moran, Jr. | H02B 1/40 | |
| | | | 220/3.94 | |
| 5,601,230 A * | 2/1997 | Bell | B65D 5/42 | |
| | | | 141/337 | |
| 5,605,161 A * | 2/1997 | Cross | A61B 10/007 | |
| | | | 4/144.2 | |
| D388,328 S * | 12/1997 | Harris | D9/447 | |
| 5,699,959 A * | 12/1997 | Huspeka | B65D 5/685 | |
| | | | 229/125.26 | |
| 5,794,672 A * | 8/1998 | Goldberg | A01G 27/006 | |
| | | | 141/331 | |
| 5,918,743 A * | 7/1999 | Uitz | B65D 11/1833 | |
| | | | 206/509 | |
| 6,032,815 A | 3/2000 | Elstone | | |
| 6,050,410 A * | 4/2000 | Quirion | B65D 19/20 | |
| | | | 206/386 | |
| 6,276,411 B1 * | 8/2001 | Veneziano | B67C 11/02 | |
| | | | 141/337 | |
| 6,405,888 B1 * | 6/2002 | Overholt | B65D 11/1833 | |
| | | | 220/1.5 | |
| 6,460,200 B1 * | 10/2002 | Mottale | A61F 5/4556 | |
| | | | 141/331 | |
| 6,564,960 B1 * | 5/2003 | Grindstaff | A01G 9/026 | |
| | | | 217/12 R | |
| 6,612,441 B2 * | 9/2003 | Lang | B65D 19/20 | |
| | | | 206/600 | |
| 6,669,045 B2 * | 12/2003 | Wang | B65D 37/00 | |
| | | | 190/126 | |
| D499,482 S * | 12/2004 | Gugliotta | D24/122 | |
| 6,938,860 B2 | 9/2005 | Singleton | | |
| 6,976,602 B1 * | 12/2005 | Maxwell | B65D 1/40 | |
| | | | 220/4.21 | |
| 7,237,583 B2 | 7/2007 | Salani et al. | | |
| D567,038 S * | 4/2008 | Carallo | D7/700 | |
| 7,503,455 B2 | 3/2009 | McDade | | |
| D593,383 S * | 6/2009 | Pallotto | D7/700 | |
| 7,654,402 B2 | 2/2010 | Kusuma et al. | | |
| 7,699,212 B2 | 4/2010 | Turvey et al. | | |
| 7,985,218 B2 * | 7/2011 | Dipoto | A61B 17/0218 | |
| | | | 604/104 | |
| 8,066,136 B2 * | 11/2011 | Turvey | B65D 11/186 | |
| | | | 220/4.29 | |
| D652,598 S | 1/2012 | Joseph | | |
| D661,944 S | 6/2012 | Davies | | |
| D665,635 S | 8/2012 | Evans | | |
| D669,322 S | 10/2012 | Evans et al. | | |
| D671,377 S | 11/2012 | Roberts | | |
| D673,012 S | 12/2012 | Holding et al. | | |
| D675,055 S | 1/2013 | Joseph | | |
| D677,532 S | 3/2013 | Joseph | | |
| D679,144 S | 4/2013 | Holding et al. | | |
| D679,952 S | 4/2013 | Holding et al. | | |
| D682,615 S | 5/2013 | Holding et al. | | |
| D682,633 S | 5/2013 | Evans | | |
| D683,200 S | 5/2013 | Joseph | | |
| D684,430 S | 6/2013 | Holding et al. | | |
| D684,431 S | 6/2013 | Holding et al. | | |
| D684,437 S | 6/2013 | Joseph | | |
| D684,438 S | 6/2013 | Joseph | | |
| D686,037 S | 7/2013 | Holding et al. | | |
| D688,923 S | 9/2013 | Evans et al. | | |
| 8,561,823 B1 | 10/2013 | Krupa | | |
| D692,950 S | 11/2013 | Evans et al. | | |
| D693,082 S | 11/2013 | Evans et al. | | |
| D693,172 S | 11/2013 | Joseph | | |
| D693,185 S | 11/2013 | Evans et al. | | |
| D696,082 S | 12/2013 | Hartsthorn et al. | | |
| D697,772 S | 1/2014 | Joseph | | |
| D699,611 S | 2/2014 | Holding et al. | | |
| 8,651,309 B2 * | 2/2014 | Gualersi | B65D 11/1833 | |
| | | | 220/4.28 | |
| D703,897 S | 4/2014 | Holding et al. | | |
| D704,473 S | 5/2014 | Hartsthorn et al. | | |
| D706,587 S | 6/2014 | Holding et al. | | |
| D711,059 S | 8/2014 | Evans et al. | | |
| D711,196 S | 8/2014 | May et al. | | |
| 9,114,523 B2 * | 8/2015 | Crawford | A47G 23/00 | |
| 9,290,296 B2 * | 3/2016 | Tom | B65D 21/08 | |
| 9,301,870 B2 * | 4/2016 | Shelton | A61F 5/453 | |
| 9,346,657 B2 * | 5/2016 | Hanson | B67C 11/00 | |
| D770,935 S * | 11/2016 | Torres | D11/131 | |
| D777,031 S * | 1/2017 | Katopis | D9/436 | |
| 9,622,735 B2 * | 4/2017 | Pagliuca | A61B 17/025 | |
| 2002/0038677 A1 * | 4/2002 | Wiethoff | B65B 39/00 | |
| | | | 141/337 | |
| 2002/0179600 A1 * | 12/2002 | King | B60R 9/00 | |
| | | | 220/6 | |
| 2003/0052158 A1 * | 3/2003 | Spindel | B65D 11/1853 | |
| | | | 229/122.21 | |
| 2004/0069780 A1 * | 4/2004 | Apps | B65D 11/1833 | |
| | | | 220/7 | |
| 2004/0155037 A1 * | 8/2004 | Hoogland | B65D 1/225 | |
| | | | 220/6 | |
| 2004/0164132 A1 * | 8/2004 | Kuester | B65D 1/225 | |
| | | | 229/117.06 | |
| 2005/0061859 A1 * | 3/2005 | Hennessy | B65D 5/4204 | |
| | | | 229/112 | |
| 2005/0224563 A1 | 10/2005 | Turvey et al. | | |
| 2005/0230390 A1 * | 10/2005 | Glenn | D06F 95/002 | |
| | | | 220/6 | |
| 2006/0191983 A1 * | 8/2006 | Cargile, Jr. | B65D 5/743 | |
| | | | 229/103 | |

(56) References Cited

U.S. PATENT DOCUMENTS

| | | | | |
|---|---|---|---|---|
| 2007/0007289 | A1* | 1/2007 | Hoberman | B65D 11/186 220/6 |
| 2007/0045311 | A1* | 3/2007 | Wang | B65D 11/186 220/9.1 |
| 2007/0062607 | A1* | 3/2007 | Salani | B67C 11/02 141/337 |
| 2008/0029658 | A1* | 2/2008 | Vanbost | B65B 67/04 248/99 |
| 2008/0041491 | A1* | 2/2008 | Salani | B67C 11/02 141/337 |
| 2012/0055941 | A1* | 3/2012 | Messerschmid | B65D 3/04 220/694 |
| 2012/0090724 | A1* | 4/2012 | Heller | B67C 11/02 141/1 |
| 2014/0190858 | A1* | 7/2014 | Schramm | A63H 37/00 206/457 |
| 2014/0238537 | A1* | 8/2014 | Kikuchi | G01G 19/393 141/83 |
| 2015/0290897 | A1* | 10/2015 | Le Monnier | B31D 5/0021 493/91 |
| 2017/0196406 | A1* | 7/2017 | Fleck | A47J 47/005 |
| 2018/0078882 | A1* | 3/2018 | Salani | B01D 29/085 |

OTHER PUBLICATIONS

Joseph Joseph, "Joseph Joseph Fold-Flat Grater Plus 4-in-1 Folding Box Grater", "Webpage found at http://www.josephjoseph.com/product/fold-flat-grater downloaded on Nov. 20, 2014", , pp. 2, Publisher: Joseph Joseph, Published in: US.

\* cited by examiner

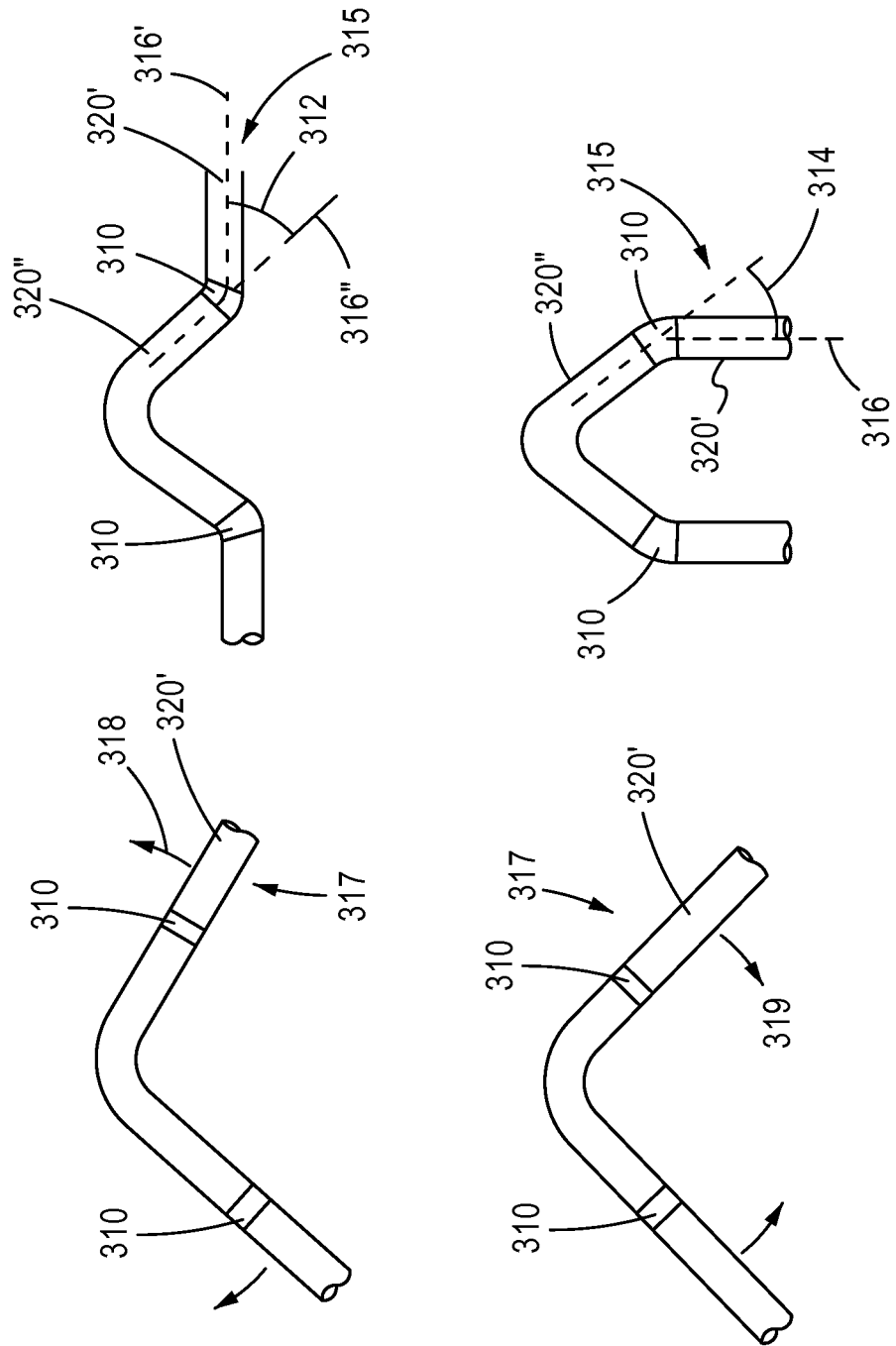

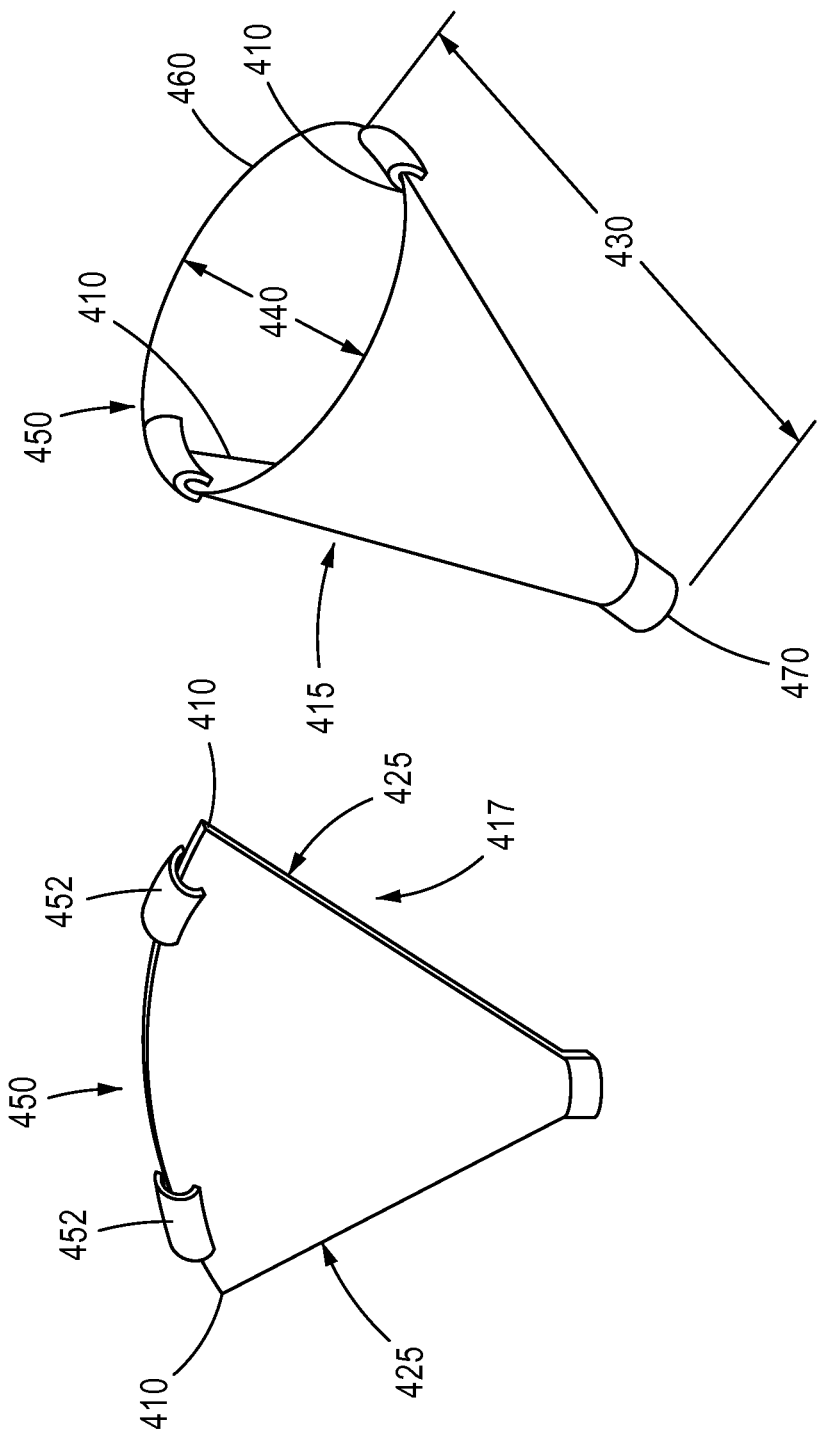

FIG.6
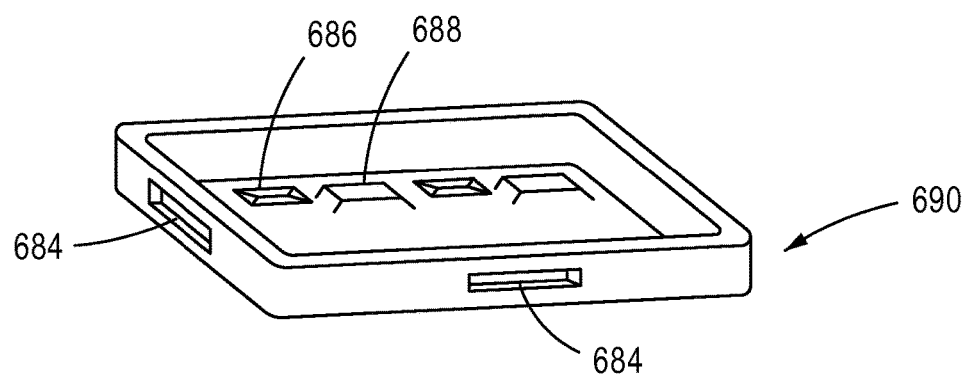
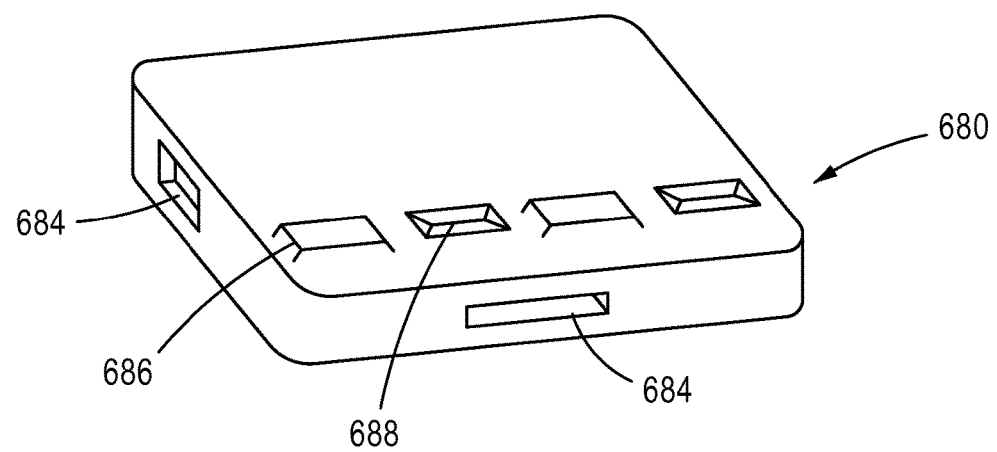

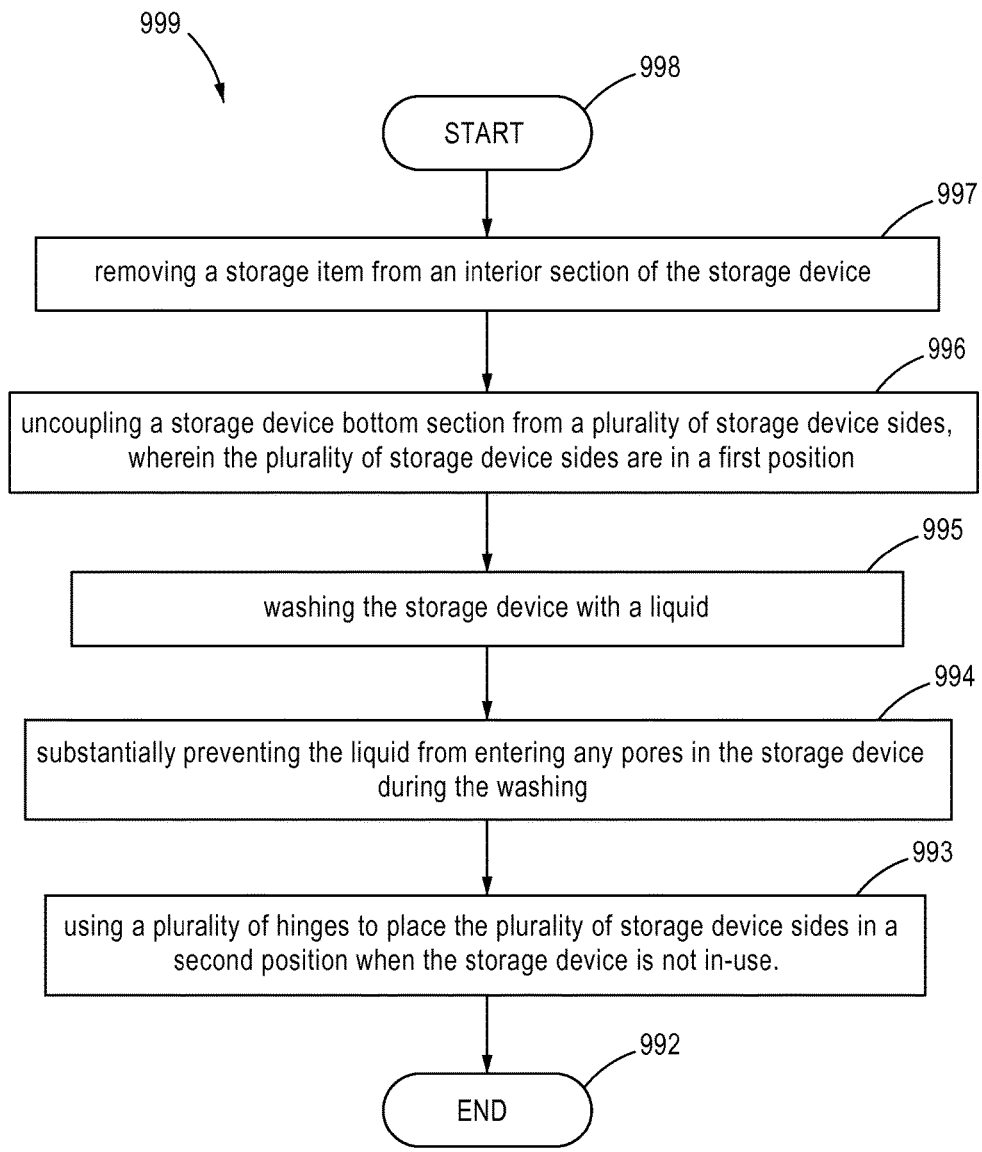

FOLDABLE STRUCTURES

PRIORITY

This application claims priority to U.S. Provisional Application No. 61/868,278, filed Aug. 21, 2013 and entitled FOLDABLE STRUCTURES, which is incorporated herein by reference.

FIELD OF THE INVENTION

The present invention relates to foldable structures. In particular, but not by way of limitation, the present invention relates to containers and funnels adapted to switch between a substantially flat storing position and a substantially open using position, the substantially open using position adapted to receive, for example, one or more of a food item and a liquid.

BACKGROUND OF THE INVENTION

It is known in the art that storage containers and funnels can take up a large amount of space when they are not in-use. For kitchens and other areas having a limited amount of storage areas, storage space comes at a premium and stacking multiple-sized storage containers, funnels, and lids can take up one or even multiple large drawers in a kitchen for even a single individual.

SUMMARY OF THE INVENTION

In order to decrease the amount of space taken up by unused storage containers and funnels, a foldable system that can be applied to storage containers and funnels was created. The foldable system enables a substantial reduction in the amount of space taken up by the storage containers and/or funnels, when not in use.

One embodiment of such a system comprises a reusable and washable storage device. The reusable and washable storage device may comprise a plurality of sides and a plurality of hinges. Each the plurality of hinges are placed between at least two of the plurality of sides and comprise an axis of rotation, with the plurality of sides rotating about the axis of rotation from a first position to a second position.

Another embodiment of the invention comprises a storage system. The storage system comprises a first reusable and washable storage device comprising a plurality of sides, a plurality of hinges, and at least one top section, and bottom section. Each the plurality of hinges are placed between the plurality of sides and comprise an axis of rotation. The plurality of sides rotate about the axis of rotation from one of a first position and a second position to the other of the first position and the second position. Additionally, each of the top section and bottom section are adapted to couple to one or more of the plurality of sides when in at least one of the first position and the second position.

Yet another embodiment of the invention comprises a method of using a storage device. One such method comprises removing a storage item from an interior section of the storage device and uncoupling a storage device bottom section from a plurality of storage device sides. The plurality of storage device sides are in a first position. The method further comprises washing the storage device with a liquid, substantially preventing the liquid from entering any pores in the storage device during the washing, and using a plurality of hinges to place the plurality of storage device sides in a second position when the storage device is not in-use.

The above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantage and a more complete understanding of the present invention are apparent and more readily appreciated by reference to the following Detailed Description and to the appended claims when taken in conjunction with the accompanying Drawings wherein:

FIG. 3 depicts a top view of moving a portion of a reusable and washable storage device between a first and a second position according to one embodiment of the invention;

FIG. 4 depicts an isometric view of a reusable and washable storage device comprising a funnel in a first position and a second position according to one embodiment of the invention;

FIG. 6 depicts an isometric view of a top section and a bottom section comprising a plurality of raised and recessed portions according to one embodiment of the invention;

FIG. 9 depicts a block diagram representing a storage device usage process according to one embodiment of the invention.

DETAILED DESCRIPTION

Described below are various embodiments of foldable structures and foldable devices such as, but not limited to, storage containers comprising food storage containers and/or funnels. It is contemplated that although a single device such as, but not limited to, a food storage container, may be described below, such description(s) may also be applied to a funnel, and vice versa. Furthermore, the descriptions below may also be applied to foldable devices other than food storage containers and/or funnels.

Figure 1:
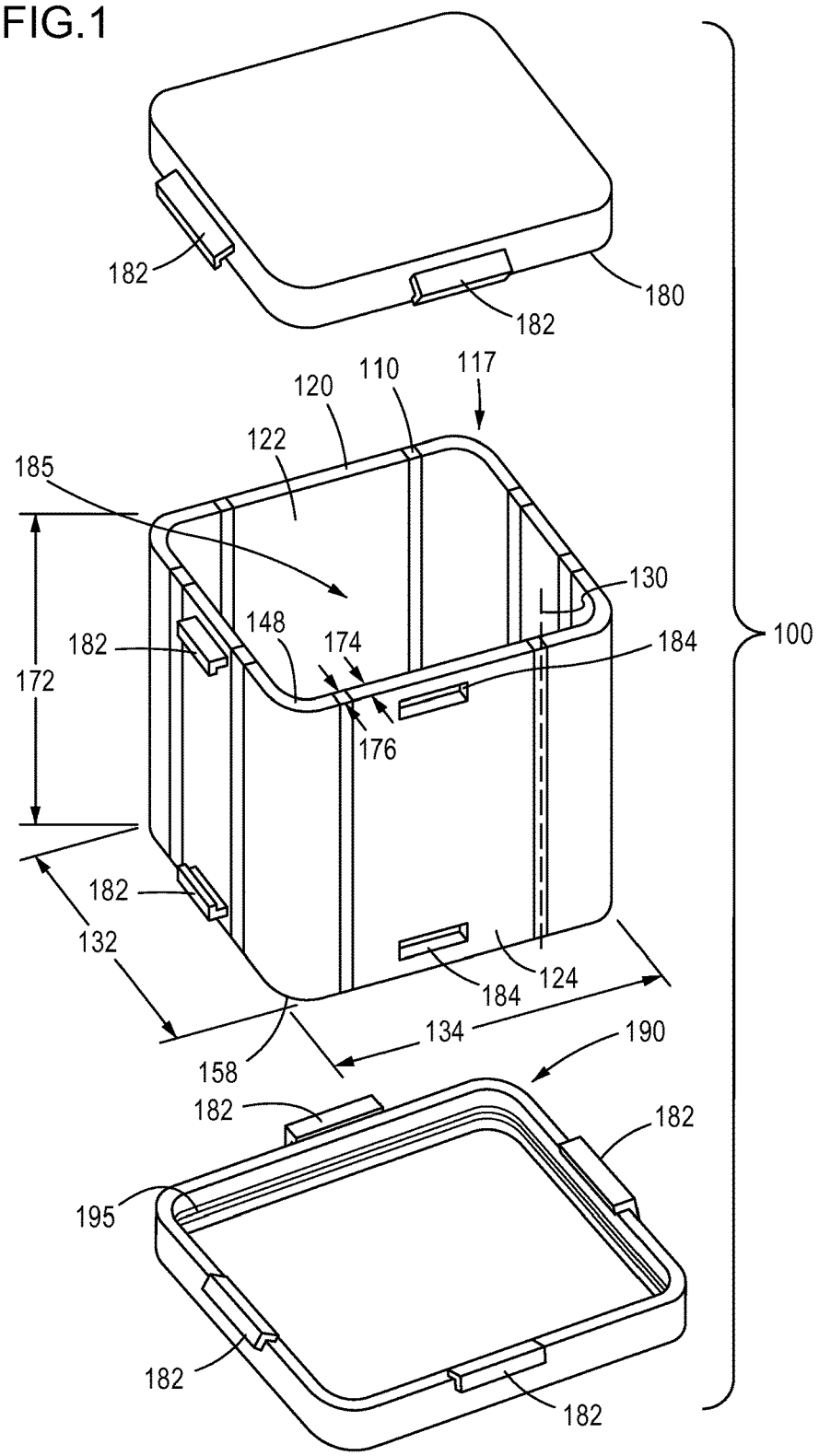
FIG. 1 depicts an isometric view of a reusable and washable storage device, a top section, and a bottom section in a first position according to one embodiment of the invention.
Figure 2:
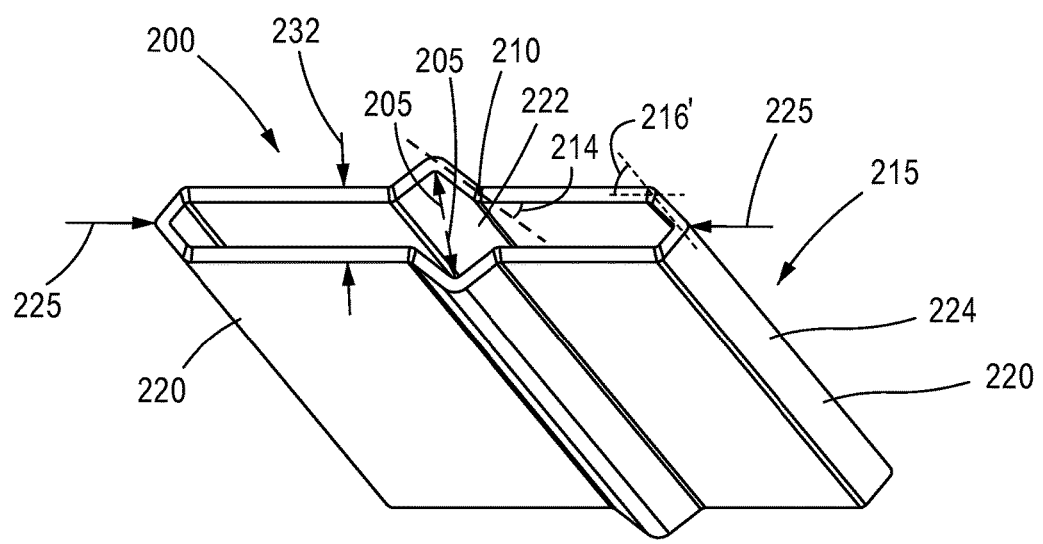
FIG. 2 depicts an isometric view of a reusable and washable storage device in a second position according to one embodiment of the invention.

Seen in FIG. 1 is an isometric view of a reusable and washable storage device 100. The device 100 may also be referred to herein as a system or a storage system. One such storage device may comprise a polymeric material or materials that are adapted to be cleaned through washing in, for example, a dishwasher. One such polymeric material may comprise polycarbonate. Other washable and reusable materials are also contemplated. After washing of the device 100, the device may be used once again to store an item. The reusable and washable storage device 100 displayed in FIG. 1 is in an open position and comprises a plurality of sides 120 and hinges 110. The hinges 110 may comprise an elastomeric material such as, but not limited to, a polystyrene-based material. Other materials, material types, and designs than what is seen in FIG. 1 are contemplated. For example, a polymeric material may be used for the hinges, such as, but not limited to, polypropylene and/or polyethylene. With such hinge material, the sides 120 may comprise a first thickness 174 and the hinges 110 may comprise a second thickness 176, the second thickness 176 comprising as smaller thickness than the first thickness 174 and enabling the hinges 100 to rotate. Throughout the specification, the hinges 110 may be referred to herein as a "living hinge" or "living hinges," where appropriate. The term "living" is used to identify the hinge 110 as having a repeatable opening and closing feature and changing the device such as, but not limited to, changing the device 100 from an open first position seen in FIG. 1 to a closed second position, as seen in FIG. 2. Furthermore, in one embodiment, the device 100 may be comprised of a flexible material and the device 100 may be comprised of one or more interlocking sections.

The hinges 110 may be coupled to the sides 120 through an adhesive material. Alternatively, where the sides 120 comprise a first thickness 174 and the hinges 110 comprise a second thickness 176, the sides 120 and hinges 110 may be integrated. The term "integrated" or any similar term refers to a single unitary device or structure, while the term "couple" or any similar term refers to two or more devices bound together with a separate mechanism. Furthermore, although the hinges 110 are shown and described herein as comprising an elastomeric material, the hinges 100 may also comprise another type of hinges known in the art—mechanical or otherwise. Additionally, the hinges 110 may be coupled to the sides 120 with another coupling mechanism such as, a clasp, magnetic, or any other coupling mechanism known in the art.

As seen in FIG. 1, each of the plurality of hinges 110 are placed between at least two of the plurality of sides 120. Furthermore, each hinge 110 comprises an axis of rotation 130. One axis of rotation 130 may be located about in the center of the hinge 110 and may run substantially parallel to an interior side surface 122 and/or an exterior side surface 124. Turning now to FIG. 3, seen is a range of rotation for the hinges 310, with the axis of rotation 130 seen in FIG. 1 being substantially perpendicular to the FIG. 3 images. An angle of rotation may comprise a first angle 312 and a second angle 314. The first angle 312 may comprise the amount, in degrees, that a first side 320' rotates away from a centerline 316 of a second side 320" after moving the first side 320' in a first direction 318. Similarly, the second angle 314 may comprise the amount, in degrees, that a center line 316' of the first side 320 rotates away from the centerline 316" of the second side 320" after moving the first side 320' in a second direction 319. The first direction 318 may substantially oppose the second direction 319. In one embodiment, the first angle 312 and second angle may each comprise forty-five degrees. In such a case, the angle of rotation for the hinge 310 may comprise ninety degrees. It is further contemplated that the angle of rotation for the hinge may comprise about 180 degrees or even more—up to 270 degrees or more, with each of the first angle 312 and second angle 314 having about equal portions of this angle of rotation.

Turning now to FIG. 2, seen is the reusable and washable storage device 200 in a closed position. As seen, each hinge 210 may be subjected to a first angle 214 or a second angle 216. Returning now to FIG. 3, the position of the first side 320' prior to moving in the first direction 318 or second direction 319 comprises a first position 317 while the position of the first side 320' after moving in the first direction 318 or second direction 319 comprises a second position 315. FIG. 1 also shows a device 100 in a first position 117, while FIG. 2 shows a device 200 in a second position 215.

It is contemplated that the devices 100 described herein may comprise varying sizes. For example, the height 172 of the device 100 seen in FIG. 1 may comprise about 3.5 inches. However small devices 100 from about 1 inch in height up to larger funnels of about 16 inches in height 130 are also contemplated. The length 134 and thickness 132 of the device 100 may be substantially similar to the height 130 or may comprise a different size. As such, the device 100 may comprise a cubed or cuboid device 100. It is further contemplated that the shape of the device may comprise a cylindrical shape. Furthermore, turning to the funnel 450 in FIG. 4, it is contemplated that a diameter 440 and a height 430 of such a funnel 150 may also range from about 1 inch to about 16 inches, although larger and smaller funnel diameters 440 and heights 430 are contemplated. The diameter 440 of one embodiment may be about the same size as the height 430.

Seen in FIG. 2 is an isometric view of a device 200 in the closed position. As seen, the width 232 of the device 200 in the second position 215 may be substantially smaller than the thickness 132 and/or length 134 of the device 100 in the open position seen in FIG. 1. Enabling the change in thickness 132, width 232, and length 134 between the open and closed positions seen in FIGS. 1 and 2, respectively are the living hinges 110, 210 seen in FIGS. 1 and 2. As seen in comparing the FIG. 2 closed width 232 to the FIG. 1 open thickness 132, the space needed to store the funnel 200 in the closed position seen in FIG. 2 comprises a much smaller space than the space needed to store the open device 100 seen in FIG. 1.

The living hinges 110, 210 may operate to change from the closed position of FIG. 2 to the open position of FIG. 1 by applying a force to the device. For example, and as seen in FIG. 2, a force may be applied in a first force direction 205 on opposing interior side surfaces 222 and/or the force may be applied in a second force direction 225 to exterior side surfaces 224 of substantially opposing sides 220.

Upon the device 100 being applied in an amount adapted to place the device 100 in a fully open position, the device 100 may be adapted to lock in the fully open position. For example, and in turning now to FIG. 4, the funnel 450 may change from the first position 417 to the second position 415 by applying pressure to the living hinges 410 in the second force direction 425 after removing a locking mechanism 452 which is adapted to keep the funnel 450 in the fully closed position. In one embodiment, the locking mechanism may comprise a mechanical device used to keep the funnel 450 in the open position 415. Such a mechanical device may comprise a generally circular end-cap adapted to be placed on, for example a top end 460 or a bottom end 470 or the funnel 450. Other mechanical devices known in the art which are adapted to keep a funnel 450 or food container in an open position are contemplated. The locking mechanism 452 may be placed over the hinges 410. It is contemplated that the hinges may be opposing hinges 410. Similarly, two or more of the hinges 510 seen one of the device 500 examples in FIG. 5A may also comprise opposing hinges 510. As seen, the number of hinges 510 may comprise an even number of hinges 510 such as, but not limited to, four, six, or eight hinges 510 as an even number of hinges 510 may enable a substantially flat device 100 in a closed position. A device 100 may also comprise an odd number of hinges 100—for example in a cylindrical device 100. Each of the hinges 510 in one embodiment may comprise about the same dimensions as each of the other hinges 510. For example, a length and width of each hinge 510 may be about the same. In other embodiments, one or more hinges 510 may comprise different dimensions such as length or width.

Figure 5A:
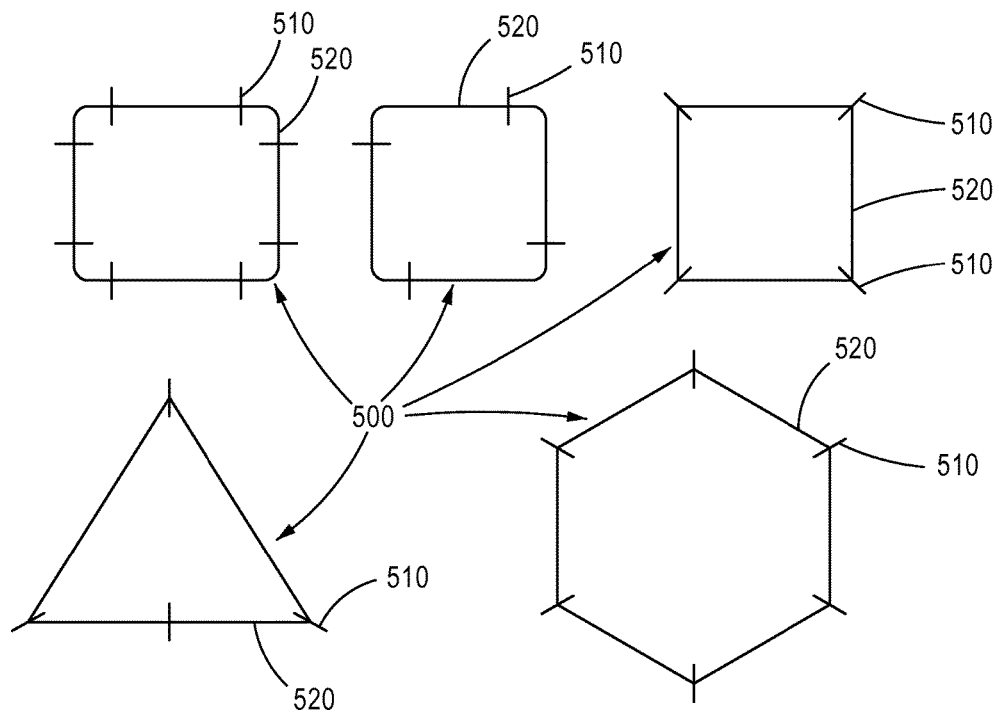
FIG. 5A depicts a top view of varying hinge/side configurations for a washable and reusable storage device according to one embodiment of the invention.
Figure 5B:
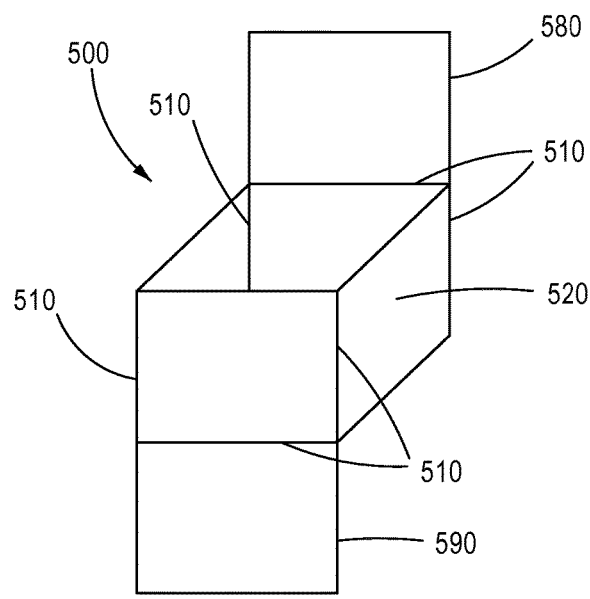
FIG. 5B depicts an isometric view of a hinge/side configuration for a washable and reusable storage device according to one embodiment of the invention.

Turning now to FIG. 5A, seen are various shapes of example reusable and washable storage devices 500. The example devices 500 show the locations where the plurality of hinges 510 may be located relative to the plurality of sides 520. FIG. 5B comprises a device 500 having a top section 580 and a bottom section 590 integrated to one or more walls 520 of the device 500. For example, the top section and bottom section 590 may be integrated or coupled to at least one of a plurality of hinges 510 which may then be coupled or integrated to one or more sides 520. The device 500 is adapted to fold along the hinges 510 to create a substantially flat device 500 when the device 500 is not in use and a substantially open device 500 to receive a storage item when the device 500 is in use. One storage item may comprise an item of food to store for consumption at a later time.

Figure 8:
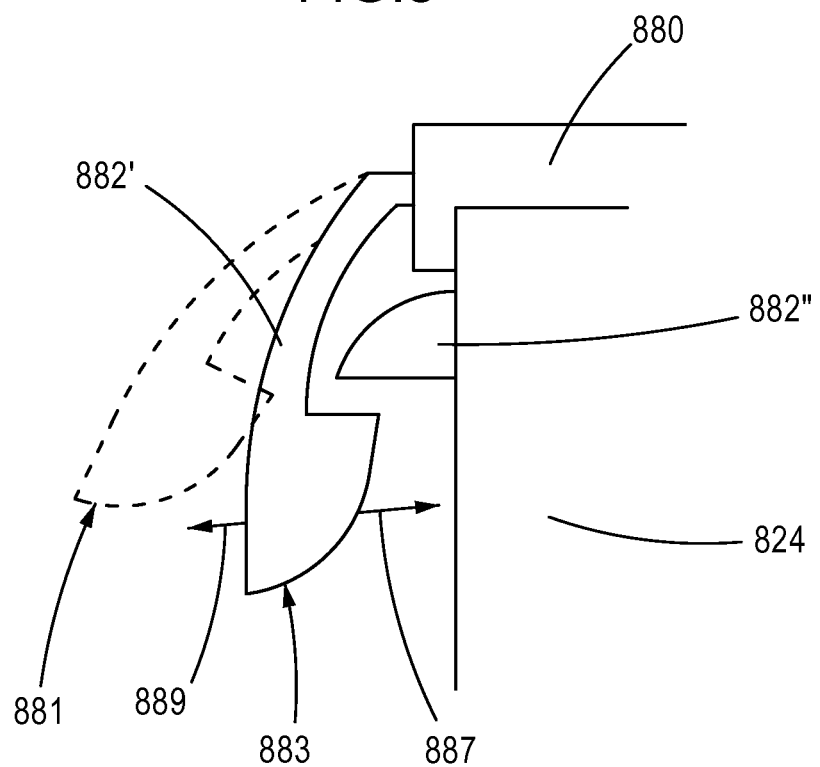
FIG. 8 depicts a side view of a first extension and a second extension adapted to couple a top section and/or a bottom section to a side surface.

Returning now to FIG. 1, seen are additional examples of a top section 180 and a bottom section 190. The top section 180 and bottom section 190 seen in FIG. 1 may be adapted to couple to the device 100. For example, one or more extensions 182 on the top section 180 and bottom section 190 may be adapted to couple to one or more notches 184 on the exterior side surface 124. The extensions may comprise tabs. Alternatively, one of more extensions 182 on the exterior side surface 124 may be adapted to couple to one or more notches 684 on the top section 680 and bottom section 690, as seen in FIG. 6. Other coupling mechanisms known in the art besides the extension 182/notch 184 may be used. For example, seen in FIG. 8 is an example of a first extension 882' and second extension 882". The first extension 882' may be one of coupled and integrated to a top section 880 or a bottom section 190 while the second extension 882" may be one or coupled and integrated to the exterior side surface 824. The first extension 882' may generally rotate about where the first extension couples to the top section 880 or bottom section 190 from an initial extension position 881 to a final extension position 883. In order to attach the first extension 882' to the second extension 882", the first extension 882' is placed under the second extension 882". For example, upon placing the top section 180 or bottom section 190 on the sides 120 and hinges 110 at or near a proximal end 148 and/or distal end 158, the first extension 882' is moved in an initial direction 887 from the initial extension position 881 to the final extension position 883. To remove the top section 880 or bottom section 190, the first extension 88' is moved in a final direction 889 from the final extension position 883 to the initial extension position 881. The top section 180 and bottom section 190 may not comprise extensions 182 or notches 184 and may couple to the sides 120 and/or hinges 110 through pressure. For example the gasket 195 may couple the top section and bottom section 190 to the sides/hinges.

Upon coupling the top section 180 and bottom section 190, the interior section 185 of the device 100 may comprise a substantially water-proof and/or water-resistant interior section 185. For example, a gasket 195 may be used to create a seal with the sides 120 and hinges 110 upon coupling to the sides 120 and hinges 110. This seal may ensure the interior 185 of the device 100 to comprise a water-proof or water-resistant area and therefore may comprise a substantially water-proof/water-resistant seal. It is further contemplated that the extensions 182 may comprise different extensions that what is seen in the figures and may couple to something other than a notch 184. It is contemplated that more than one tab extension 182 may be needed to be released from the notch 184 in order for the waterproof seal to be broken.

It is contemplated that the tab extension 182 may comprise a "T" shape and the vertical portion of the T may comprise at least one outward bend initially away from the top section 180 or bottom section 190 and then to the container sides 120 when coupled to the sides 120. One end of the T-tab may couple to the container by exerting pressure on a side 120 proximal to where the T-tab is coupled to the side 120. The tab may be released by pulling the tab away from the container device 100. The notch 184 and extension 182 described herein may comprise a single feature in one embodiment. Additionally, it is contemplated that the extension 182 may extend around substantially the entirety of the exterior side surface 124 may be referred to herein as a ridge. The ridge or extension 182 may be adapted to receive the gasket 195. It is further contemplated that the ridge is only located on the exterior side walls 124 and is not located on the hinges 110.

It is further contemplated that the top section 680 and bottom section 690 may comprise one or more raised portions 686 and recessed portions 688. The raised portions 686 may be referred to herein as raised surface features. The raised and recessed portions 686, 688 on the top section 680 may be adapted to align and mate with raised and recessed portions 686, 688 on the bottom section 690. Such mating may be adapted to generally prevent movement of the top section 680 and/or bottom section 690 upon mating the top section 680 and bottom section 690. Such mating may occur when stacking various devices 100 after coupling the top section 180 and bottom section 190 to the walls 120 and hinges 110. It is contemplated that the exterior walls 124 of the sides 120 seen in FIG. 1 may also comprise one or more raised and recessed portions 686, 688 so that the sides 120 of a first device 100 may stack/couple to the sides 120 of a second device 100 when in the closed position.

Figure 7A:
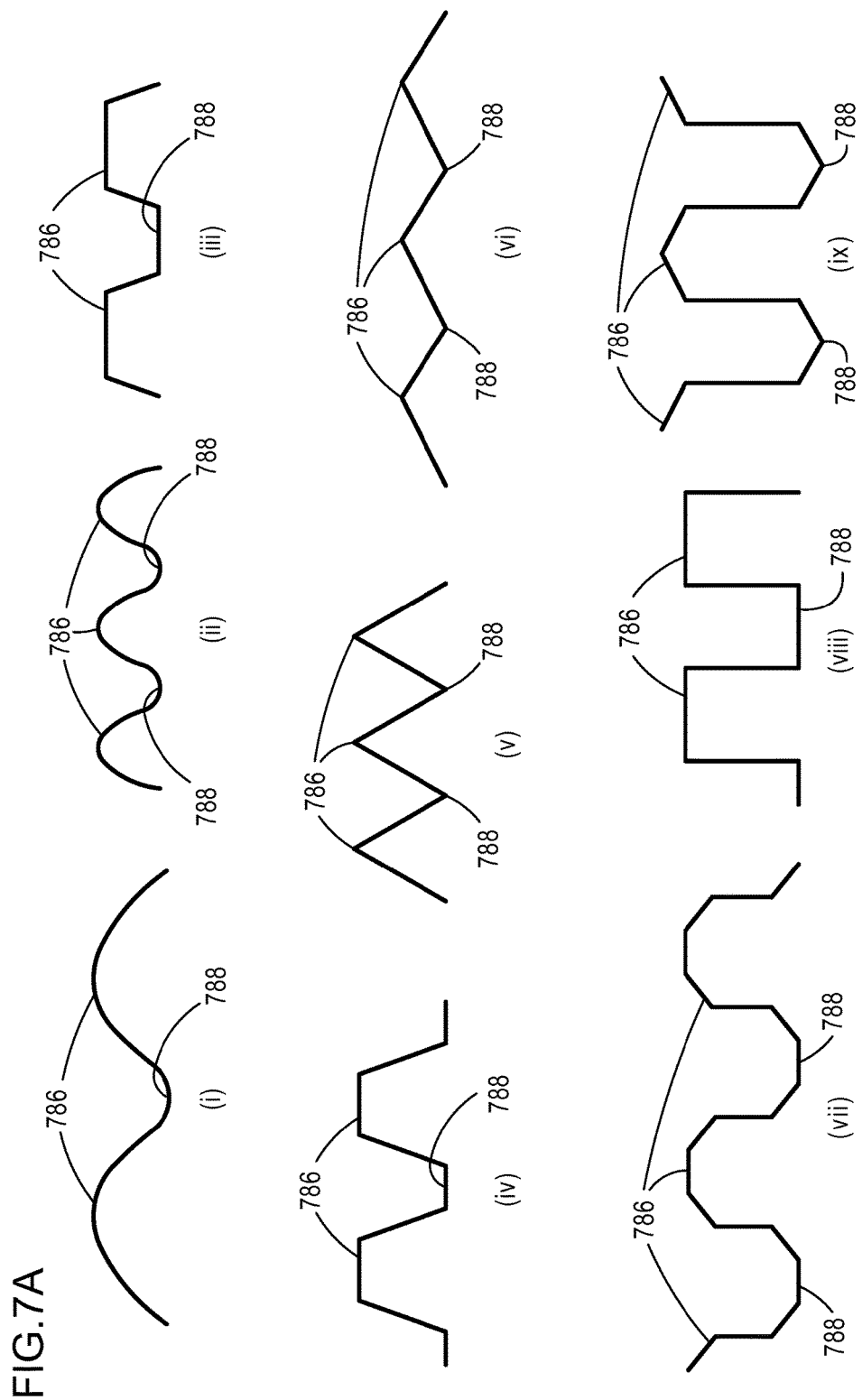
FIG. 7A depicts a side view of varying raised and recessed portion configurations according to one embodiment of the invention.
Figure 7B:
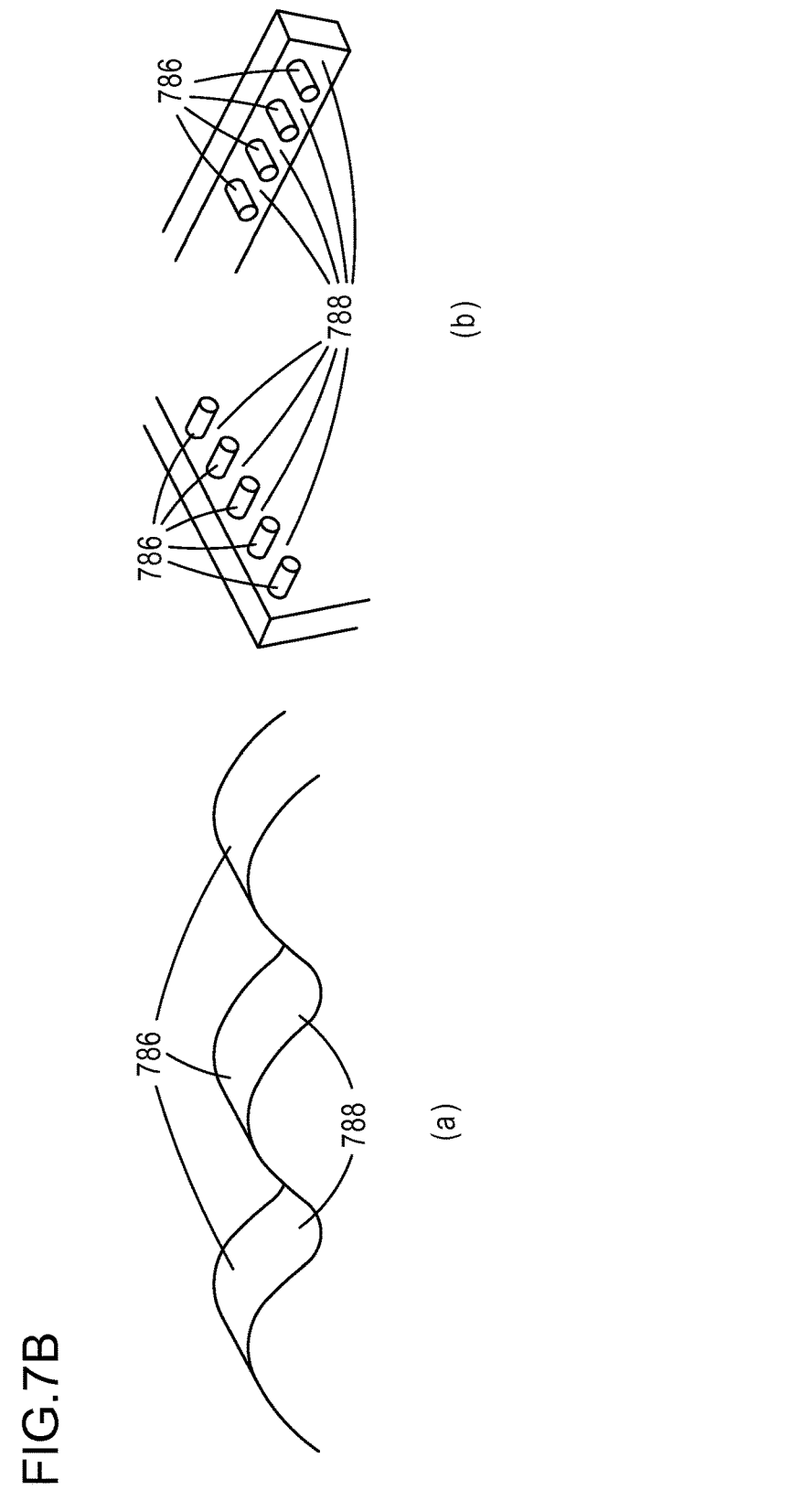
FIG. 7B depicts an isometric view of two raised and recessed portion configurations according to one embodiment of the invention.

Turning now to FIG. 7A seen are side-view examples of raised portions 786 and recessed portions 788. Example (i) comprises a rounded raised and recessed portion 786, 788. Example, (ii) comprises a rounded raised and recessed portion 786, 788 having steeper sidewalls. Examples (iii) and (iv) comprise trapezoidal raised and recessed portions 786, 788, with example (iv) having a taller raised and recessed portion 786, 788 as compared to example (iii). Example (v) and (vi) comprise triangular raised and recessed portions 786, 788, with example (v) having a taller raised and recessed portion 786, 788 as compared to example (vi). Examples (vii)-(ix) comprise varying shapes of raised and recessed portions 786, 788. FIG. 7B comprises isometric views of raised and recessed portions 786, 788. Varying shapes and sizes are contemplated and example (a) is one such shape and size. Furthermore, and as seen in example (b), the raised portion 786 may comprise extensions such as, but not limited to, columnar extension and the recessed portion 788 may comprise the spaces between the extensions. It is further contemplated that the raised and recessed portions may be placed proximal an edge of the top section and bottom section. It is further contemplated that the device 100 may comprise a metal device.

Turning now to FIG. 9, seen is a method 999 of using a storage device. One such storage device may comprise the device 100 described above with reference to FIGS. 1-8. One such method 999 starts a 998 and at 997 comprises removing a storage item from an interior section of the storage device. For example, a food item may comprise a storage item and the food item may be removed from the interior section 185 of the device 100 seen in FIG. 1. At 996 the method 999 comprises uncoupling a storage device bottom section from a plurality of storage device sides, wherein the plurality of storage device sides are in a first position. Such a method step comprises, for example, uncoupling the bottom 190 seen in FIG. 1 from the sides 120 and hinges 110 seen in FIG. 1.

At 995 the method 999 comprises washing the storage device 100 with a liquid. This step may comprise putting the 100 in a washing machine. At step 994 the method comprises substantially preventing the liquid from entering any pores in the storage device during the washing. This method may comprise using a material such as, but not limited to, a polymeric material adapted repel instead of absorb or adsorb liquid. At step 993 the method comprises using a plurality of hinges to place the plurality of storage device sides in a second position when the storage device is not in-use. For example, and as described above, the hinges 100 may be used to move the device from the first position 117 seen in FIG. 1 to the second position 215 seen in FIG. 2, and vice versa. The method 999 ends at 992.

Although not seen in FIG. 9, the one method 999 may comprise repeating the step 995 of washing the storage device with a liquid. Furthermore, the step 994 of substantially preventing the liquid from entering any pores in the storage device during the washing may comprise retaining the structural integrity of the storage device. For example, upon washing a paper-based device, the structural integrity of the storage device 100 would not be retained. However, the structural integrity of a polymeric device would be retained.

A method 999 may further comprise returning the plurality of storage device sides to the first position. For example, the device 200 may be moved from the second position 215 seen in FIG. 2 to the first position 117 seen in FIG. 1. At this point, the storage device bottom section 190 may be coupled to at least one of the plurality of storage device sides 120, a new storage item may be placed in the interior section 185, and a storage device top section 180 may be coupled to the plurality of storage device sides 120.

The device 100 top section and storage device bottom section may be coupled to opposing ends of the plurality of storage device sides. Furthermore the storage device may comprise a first storage device. One method 999 may yet further comprise stacking a second storage device with the first storage device. Stacking a second storage device with the first storage device may comprise aligning one or more of ridged and recessed surface features in one of the first storage device plurality of sides, top section and bottom section, with the other of ridged and recessed surface features in one of the second storage device plurality of sides, top section, and bottom section.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:
1. A storage system comprising,
a first reusable and washable storage device comprising,
  a plurality of sides comprising,
    a plurality of first sides, wherein,
      the plurality of first sides comprise curved sides, and
      each portion of the curved sides having a first side centerline,
    a plurality of second sides, wherein,
      the plurality of second sides comprise straight sides, and
      the straight sides comprising a second side centerline, and
    a plurality of hinges, and
  at least one,
    top section, and
    bottom section, wherein,
  each the plurality of hinges,
    are placed between the plurality of sides, and
    comprise an axis of rotation,
  the plurality of sides rotate about the axis of rotation,
    from one of a first position and a second position to the other of the first position and the second position, wherein,
      the first position comprises an open position,
      the open position comprises the second side centerline aligning with the first side centerline,
      the second position comprises a closed position,
      the closed position comprises,
        the centerline in a first of the plurality of first sides rotated in a first direction,
        the centerline in a second of the plurality of second sides rotate in a second direction,
      the second direction opposes the first direction,
  each of the top section and bottom section are adapted to couple to one or more of the plurality of sides when in at least one of the first position and the second position, and
  at least one of the top section and bottom section comprise an outer surface having one or more first raised surface features; and
a second reusable and washable storage device comprising,
  a plurality of second device sides comprising a plurality of second hinges,
  at least one,
    second device top section, and
    second device bottom section, wherein,
  each of the plurality of second device hinges,
    are placed between the plurality of second device sides, and
    comprise a second device axis of rotation,
  the plurality of second device sides rotate about the second device axis of rotation,
    from a second device sides first position,
    to a second device sides second position, and
  each of the second device top section and second device bottom section,
    are adapted to couple to one or more of the plurality of second device sides when in at least one of the second device sides first position and the second device sides second position, and
comprise one or more second raised surface features wherein, the one or more second raised surface features are adapted to mate with the one or more first raised surface features.

2. The storage system of claim 1 wherein,
the open position comprises an interior section; and
the interior section comprises at least one of a substantially and a generally water-resistant section when the top section and bottom section are coupled to the plurality of sides.

3. The storage system of claim 2 further comprising a storage item; and wherein, the interior section is adapted to receive the storage item.

4. The storage system of claim 1 wherein,
the top section of the first and second device comprises,
the one or more first ridged surface features, and
one or more recessed surface features;
the bottom section of the first and second device comprises the one or more second ridged surface features,
the one or more second ridged surface features being adapted to mate with the one or more recessed surface features.

5. A storage system comprising,
a first reusable and washable storage device comprising,
a plurality of sides comprising,
a plurality of first sides, wherein,
the plurality of first sides comprise curved sides, and
each portion of the curved sides having a first side centerline,
a plurality of second sides, wherein,
the plurality of second sides comprise straight sides, and
the straight sides comprising a second side centerline, and
a plurality of hinges, and
at least one,
top section, and
bottom section, wherein,
each the plurality of hinges,
are placed between the plurality of sides, and
comprise an axis of rotation,
the plurality of sides rotate about the axis of rotation from one of a first position and a second position to the other of the first position and the second position, wherein,
the first position comprises an open position,
the open position comprises the second side centerline aligning with the first side centerline,
the second position comprises a closed position,
the closed position comprises,
the centerline in a first of the plurality of first sides rotated in a first direction,
the centerline in a second of the plurality of second sides rotated in a second direction, and
the second direction opposes the first direction,
each of the top section and bottom section are adapted to couple to one or more of the plurality of sides when in at least one of the first position and the second position,
the top section comprises an outer surface having one or more first raised surface features, and
the bottom section comprises the one or more first recessed surface features; and
a second reusable and washable storage device comprising,
a plurality of second device sides comprising a plurality of second device hinges,
at least one,
second device top section, and
second device bottom section, wherein,
each of the plurality of second device hinges,
are placed between the plurality of second device sides, and
comprise a second device axis of rotation,
the plurality of second device sides rotate about the second device axis of rotation,
from a first position of the second device sides,
to a second position of the second device sides, and
each of the second device top section and second device bottom section are adapted to couple to one or more of the plurality of second device sides when in at least one of the first position of the second device sides and the second position of the second device sides,
the top section of the second device comprises one or more second raised surface features, the one or more second raised surface features adapted to mate with the one or more first recessed surface features, and
the bottom section of the second device comprises one or more second recessed surface features, the one or more second recessed surface features adapted to mate with the one or more first raised surface features.

6. The storage system of claim 5 wherein,
the open position comprises an interior section; and
the interior section comprises at least one of a substantially and a generally water-resistant section when the top section and bottom section are coupled to the plurality of sides.

7. The storage system of claim 6 further comprising a storage item; and wherein, the interior section is adapted to receive the storage item.

* * * * *